(12) United States Patent
Hodd et al.

(10) Patent No.: US 6,849,669 B1
(45) Date of Patent: Feb. 1, 2005

(54) HYDROPHILIC MACROMOLECULAR COMPOUNDS

(75) Inventors: Kenneth A. Hodd, Wrexham (GB); Keith Alfred Dillingham, Channel Islands (GB); Jacqueline deGroot, Leek (NL); Hendrik Haitjema, Peize (NL)

(73) Assignee: Pharmacia Groningen BV, Groningen (NL)

( * ) Notice: Subject to any disclaimer, the term of this patent is extended or adjusted under 35 U.S.C. 154(b) by 0 days.

(21) Appl. No.: 09/936,653

(22) PCT Filed: Mar. 16, 2000

(86) PCT No.: PCT/EP00/02537

§ 371 (c)(1),
(2), (4) Date: Feb. 28, 2002

(87) PCT Pub. No.: WO00/55214

PCT Pub. Date: Sep. 22, 2000

(30) Foreign Application Priority Data

Mar. 16, 1999 (SE) .............................................. 9900935

(51) Int. Cl.[7] .............................. C08F 2/46; C08F 2/50
(52) U.S. Cl. .............................. 522/35; 568/8; 568/11; 568/12; 568/14; 568/15; 522/6; 522/178; 522/905; 522/38; 522/49; 522/50; 522/57; 522/64; 522/90; 522/171; 522/173; 522/174; 522/175; 522/84; 522/85; 522/86; 522/113; 522/114; 522/115
(58) Field of Search .................................. 568/8, 11, 12, 568/14, 15; 522/6, 35, 905, 38, 49, 50, 57, 64, 90, 171, 173, 174, 175, 178, 182, 84, 85, 86, 113, 114, 115

(56) References Cited

U.S. PATENT DOCUMENTS 4,536,265 A    8/1985  Fabrizio et al.
4,977,293 A *  12/1990 Hatton et al. ................ 558/153
5,100,987 A *   3/1992 Hatton et al. ................ 526/313
5,527,925 A *   6/1996 Chabrecek et al. ......... 549/430
5,532,112 A *   7/1996 Kohler et al. ............ 430/281.1
5,612,389 A *   3/1997 Chabrecek et al. ........... 522/35
5,612,391 A *   3/1997 Chabrecek et al. ......... 523/106
5,621,018 A *   4/1997 Chabrecek et al. ........... 522/35
5,767,169 A     6/1998 Leppard et al.
6,007,833 A *  12/1999 Chudzik et al. ............ 424/425
6,087,412 A     7/2000 Chabrecek et al.
6,096,369 A     8/2000 Anders et al.
6,156,345 A *  12/2000 Chudzik et al. ............ 424/484
6,204,306 B1 *  3/2001 Chabrecek et al. ......... 523/106

FOREIGN PATENT DOCUMENTS

| EP | 0800657 | 11/1998 |
| EP | 0887369 | 12/1998 |
| JP | 8-231564 | 9/1996 |
| WO | WO 9207885 | 5/1992 |
| WO | WO 9209644 | 6/1992 |
| WO | WO 9621167 | 7/1996 |
| WO | WO 9908135 | 2/1999 |
| WO | WO 9908136 | 2/1999 |

OTHER PUBLICATIONS

Angiollini et al. *Journal of Applied Polymer Science*, 51(1):133–143 (1994).

* cited by examiner

*Primary Examiner*—Rabon Sergent
*Assistant Examiner*—Sanza L McClendon
(74) *Attorney, Agent, or Firm*—Dinsmore & Shohl LLP

(57) ABSTRACT

The invention relates to macromolecular hydrophilic photocrosslinkers having polymeric backbones of substituted ethylene groups carrying photoactive groups. The photocrosslinkers are capable of producing, when being exposed to light of determined wavelengths above 305 nm, radicals which are retained on the macromolecular photocrosslinkers and reacting so as to accomplish a crosslinked network structure. The invention further relates to the preparation of photocrosslinkers, their use in different aqueous systems and their utility in production of medical devices including ophthalmic lenses.

73 Claims, No Drawings

HYDROPHILIC MACROMOLECULAR COMPOUNDS

FIELD OF INVENTION

The present invention relates to photocrosslinkers providing a combination of photoinitiating and crosslinking processes capable acting in an aqueous environment and being activated by visible light.

BACKGROUND OF INVENTION

The UV curing of resin formulations is widely used in industry as the setting process for coatings, adhesives, and more recently paints. Such formulations may comprise a combination of vinyl, usually acrylate, monomers and crosslinkers, together with a photoinitiator. Other possible constituents of the formulations include crosslinkers and vehicles. In general an advantage of photocurable formulations is that the monomers act as their own vehicle, and the use of solvent is obviated, which has environmental advantages.

Advances in the technology of photocuring, improvements such as, those in UV lamps, cationic initiators for epoxide-based formulations, water borne coatings, and many novel monomers has enabled this production process to penetrate a number of important manufacturing sectors. Photopolymerization is now used in photo resists for printed circuits and microelectronics, for photolithography, magnetic recording media, glass-fiber laminates, and for medical devices, especially for dental and ophthalmic applications.

European Patent 0800 657 describes a photoinitiator linked to a macromer structure which together with a copolymerizable monomer and a crosslinker is capable forming a polymerization product, such as an ophthalmic lens that retains photoinitiator radical in the resulting network. This is advantageous in medical applications wherein such potentially harmful radicals must be carefully controlled. However, this system would not be applicable for producing a polymerized product directly in the capsular bag in the eve since it is not directed to photoinitiators activated by light in the visible range.

For the medical applications of photopolymerization it is usual to employ visible light, rather than UV, to effect the cure of the resin formulation. The use of visible, usually blue, light avoids exposing patient and dentist or surgeon to harmful irradiation. Increasingly, the merit of this approach is being recognized for industrial practice, where operatives also need protection from prolonged exposure to harmful UV.

It is a characteristic of almost all, if not all, of the formulations used for aforementioned types of application that they are crosslinked. Crosslinking of the polymeric bases, which constitute the coatings, or artifacts of the aforementioned industrial products confers important advantages upon them. Crosslinked polymers have greater environmental (e.g. temperature and moisture) resistance, solvent resistance and dimensional and mechanical stability, than equivalent linear polymers. This is especially so for where the equivalent linear polymer are produced by photopolymerization they have an atactic, non-crystalline, structure.

Crosslinking is introduced into photopolymerized products by including in the formulation for the resin, coating or gelling system, an acrylate, or similar, crosslinker, which is characterized by having two or more crosslinkable acrylate or vinyl functions. In some formulations this crosslinking species is a polymer of low molecular weight. The crosslinker copolymerizes with the monomers of the formulation to produce a network structure.

It is an object of the present invention provide macromolecular compounds which act as hydrophilic photocrosslinkers for a great number of different polymeric systems provided with functional groups for crosslinking or with vinylic, acrylic and methacrylic monomers in aqueous solution and thereby retaining the photoactive radical in the crosslinked network.

It is another object of the present invention to provide stable hydrophilic photocrosslinkers capable of being activated at wavelengths greater than 305 nm.

It is a further object of the present invention to provide photocrosslinkers with capability to act in aqueous solutions, especially on hydrophilic polymers or water-soluble macromolecular particles made thereof having functional groups for crosslinking.

It is a still further object of the present invention to provide photocrosslinkers with enhanced photoactivity (100% conversion of monomer to polymer in aqueous solution) which reduces photoinitiator residues to a minimum, especially, vinyl modifications of the photoinitiator component and thereby reducing compositional drift. Draize and other environmental hazards.

The invention as presented below will explain how the mentioned objects are met while discussing further obvious advantages.

DESCRIPTION OF THE INVENTION

The present invention pertains to macromolecular hydrophilic photocrosslinkers having a general formula $(A)_n(B)_m(C)_p$, wherein (i) A, B and C are units of substituted ethylene groups in the macromolecular structure;

(ii) A, B and C are randomly distributed and the unit C carries a photoactive group;

(iii) n=0–98 mole %, m=0–98 mole %, m=50–98 mole % and p=0.5–50 mole %.

When the photoactive groups of units C are exposed to light of determined wavelengths above 305 nm, radicals are generated which are retained on the macromolecular photocrosslinkers and will react to form a crosslinked network structure. Preferably the final structure is solid article.

The photocrosslinker further preferably further comprises functional groups for crosslinking. Such groups are conventionally vinylic, acrylic or methacrylic groups and their nature and introduction on polymeric backbone are well known to persons skilled in the art and will be referred to as "functional groups for crosslinking".

According to one aspect of the invention an aqueous composition of the photocrosslinker in a suitable amount can be directly crosslinked into the final solid product upon sufficient irradiation. In another aspect the aqueous composition for crosslinking into a solid article comprises suitable amounts of the photocrosslinker and a hydrophilic polymer carrying functional groups for crosslinking. The photocrosslinker in such a system will thereby replace the conventional combination of crosslinker and photoinitiator. Applicable hydrophilic polymers with suitable functional can readily be provided with the skilled person for the purpose of crosslinking desired articles. For example it would be conceivable to employ polymers having a sufficiently high refractive index to be acceptable as intraocular lenses. As a further suitable example aqueous compositions of water-soluble pre-formed functionalized particles of hydrophilic polymers according to the International Patent Application PCT/EP99/04715. In a still another aspect of the present invention, the photocrosslinkers can be employed in a composition, preferably an aqueous composition further comprising at least one copolymerizable vinylic, acrylic or methacrylic monomer. Such monomers and combinations thereof are well known in the art and will not be described herein in further detail. It is, however, to be understood that the photocrosslinker will replace conventional crosslinking agents and their combination with photoinitiators in such systems.

It is highly preferred that the photoactive groups of the photocrosslinkers comprise a phosphine oxide, in order to generate the necessary radicals for crosslinking from the exposure of visible light. More preferably, the photoactive group is an acyl- or aroyl phosphine oxide.

According to a preferred aspect, the photoactive group is linked to the ethylene groups of units C of the photo-crosslinkers by a linking group comprising a phenylene group. Optionally, such a phenylene group is substituted in order to obtain more stability. The photoactive group can also be linked to said the ethylene groups by means of a linking group comprising a group having the structure —O—C(O)—NH—, i.e. a urethane bridge. Preferably, such a linking group has a structure of —O—C(O)—NH—Ph-, wherein Ph denotes an optionally substituted phenylene group.

According to one embodiment of the invention, the photocrosslinkers comprises substituted ethylene units A, B, C of a macromolecular photocrosslinker in according to:

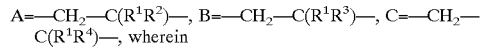

R$^1$ is hydrogen or methyl;
R$^2$ is —CON(Me)$_2$, —CO$_2$CH$_2$CH$_2$OH, —OCOCH$_3$, —OCOCH$_2$CH$_2$Ph, —OH or a lactam group;
R$^3$ is —CON(Me)$_2$, —CO$_2$CH$_2$CH$_2$OH, —OCOCH$_3$, —OCOCH$_2$CH$_2$Ph, —OH or a lactam group when B is —CH$_2$—C(R$^1$R$^3$)— with the proviso that R$^2$ and R$^3$ are not the same unless R$^2$ and R$^3$ is —OH; and
R$^4$ is —R$^5$C(O)P(O)R$^6$R$^7$ or —R$^5$P(O)R$^6$OC(O)R$^7$, wherein R$^5$, R$^6$ and R$^7$ are selected among same or different aryl groups comprising phenyl, methylphenyl, dimethylphenyl, trimethylphenyl, methoxyphenyl, dimethoxyphenyl, trimethoxyphenyl, methylolphenyl, dimethylolphenyl, trimethylolphenyl or styryl radicals, or
R$^4$ is —R$^8$C(O)P(O)R$^9$R$^{10}$, wherein R$^9$ and R$^{10}$ are the same as R$^5$, R$^6$ and R$^7$ above, but R$^8$ is a group —O—C(O)—NH—R$^{11}$, wherein R$^{11}$ is the same as R$^9$ and R$^{10}$.

In the general formula above, —OH denotes a hydroxyl group, Me a methyl group and Ph is a phenyl group. The lactam group typically is a heterocyclic ring structure of 4 to 7 atoms of which at least one is nitrogen. A suitable such lactam group provides a N-vinyl-pyrrolidone structure as one of units A or B on said ethylenic backbone. It is also to be understood that besides the mentioned substituents functional groups for crosslinking can be added to the macromolecule in accordance with conventional methods.

In one advantageous embodiment, the photocrosslinkers, R$^2$ and R$^3$ according to above are selected so as to form a water-soluble molecule.

Suitable units A and B in the general formula $(A)_n(B)_m(C)_p$ are selected among, but not limited to, N-vinylpyrrolidone (NVP), 2-hydroxyethylmethacrylate, N-N-dimethylacrylamide and vinyl acetate. The vinyl acetate referred to preferably will be hydrolyzed conventionally to vinyl alcohol. It is also referred to Table 1 below in the exemplifying part of the description for a number of specific photocrosslinkers based on such units (or co-monomers) and 4-vinylbenzoyl-diphenylphosphine oxide (VBPO) as a photoinitiating group. Accordingly, VBPO units constitute units C in said general formula above. Some especially suitable water soluble, blue light activated photocrosslinkers according to the present invention comprise NVP together with vinyl acetate units, N,N-dimethylacrylamide units alone or together with 2-hydroxyethylethacrylate units, all combined with VBPO units. These photocrosslinkers demonstrate high conversion rate (monomer to polymer) and suitably high stability in aqueous solution. This type of photocrosslinkers can be prepared by conventional radical polymerization.

According to an alternative aspect, the units C of said general formula radical R$^4$ is —O—C(O)—NH—R$^8$—C(O)P(O)R$^9$R$^{10}$, wherein R$^8$, R$^9$ and R$^{10}$ are as above. The radical R$^4$ has in this context preferably been introduced by reacting isocyanate substituted photoactive compounds having the formula O=C=N—R$^8$—C(O)P(O)R$^9$R$^{10}$ with hydroxyl groups on a macromolecular backbone $(A)_n(B)_m(C)_p$, wherein units C have been selected as units A and B, as above. Typically, such a backbone comprises vinyl alcohol units derived from a monomer or copolymer of vinyl acetate, which has undergone a conventional hydrolysis step. An example of such a macromolecular backbone is a copolymer of NVP and vinyl acetate or poly(vinyl acetate).

The invention further relates to a method of forming a macromolecular crosslinked network from an aqueous composition comprising a photocrosslinker according to above, by irradiating with light exceeding a wavelength of about 305 nm for a time sufficient to form a solid article. As earlier mentioned such a composition further may comprises one or several copolymerizable vinylic, acrylic or methacrylic monomer(s), or a hydrophilic polymer provided with functional vinylic, acrylic or methacrylic groups, or combinations such monomers and polymers.

The present invention is especially useful for the production of ophthalmic lenses, particularly, where biocompatibility conferred by hydrophilic compositions is advantageous. A particularly suitable application of the inventive photocrosslinkers is to use them in the preparation of intraocular lenses produced directly in the capsular bag of the eye after surgically having removed a defect natural lens. The photocrosslinker will then be a part of an ophthalmically acceptable composition having a suitable viscosity and fluid characteristics for being injected into the eye with conventional equipment.

The photocrosslinkers according to the present invention provide for a combination of photoinitiating and crosslinking processes. It is an important feature of the present invention to effect this combination of function by attaching photoactive groups to a polymeric or macromolecular structure. The photoactive groups, when exposed to light of the appropriate wavelength, will undergo photoinduced scission and generating radicals, which are retained on the polymeric or macromolecular structure. These retained radicals then initiate, terminate, or, in some other way participate in the gel forming process that is the objective of the radiation cure of the photomaterial. The use of the inventive photocrosslinkers confers distinct advantages, both chemical and environmental, as compared with the combination of a separate photoinitiator and crosslinker. In a chemical context the use of a photocrosslinker gives opportunities to produce networks that are more homogeneous than those produced by photocuring conventional photocurable systems. The latter systems, involving as they do, combinations of monomers, have structures dependent on the reactivity ratios of the monomers and crosslinkers. Often, for example, in a coating being manufactured at high rates of production, a crosslinker is selected because of its high reactivity. Disparities in the reactivates of the components of a formulation gives rise to compositional drift, the change of the average unit composition during the course of a polymerization, and this in relation to a reactive crosslinker implies that sections of a network forming later, in the curing process, have a lower crosslink density than sections formed earlier. Improving the homogeneity of crosslinked networks is a subject receiving greater attention as the technical demands imposed on industrial products increases. Homogenous networks have, for example, higher fracture toughness and better optical properties heterogeneous networks. The shrinkage occurring during their formation is more uniform allowing for more precision in castings. The benefits of using a photocrosslinker as a network former, as compared with a combination of photoinitiator and crosslinker, arise because the radical species they produce act as crosslinkers via the polymer chain to which they are anached. Further such radicals are generated throughout the setting phase, their concentration being controlled by the photoinitiating species quantum efficiency and the intensity of the light, which may be modulated during the setting, in addition to its concentration. This distinction results in the formation of networks having a more controlled and homogeneous structure.

Retaining photoinitiator residues in the network of a medical product, such as a contact lens or a dental filling has desirable physiological implications. Further photocrosslinkers because of their polymeric, or macromolecular, nature are more acceptable, environmentally, than many conventional crosslinkers which are known to cause skin and lung irritation.

Within the context of the present invention, it is possible to substitute a photocrosslinker, either completely, or partially, for a combination of a conventional photoinitiator and a conventional crosslinker. Alternatively, the inventive photocrosslinkers can be used in combination with a conventional photoinitiator or a conventional crosslinker as will be understood by practitioners skilled in formulating systems for crosslinking.

Persons skilled in this art will also appreciate that the inventive photocrosslinkers as described herein for photoactive systems responsive to visible light may be applied equally to systems responsive to UV light, so the present invention is of very general applicability.

DETAILED AND EXEMPLIFYING DESCRIPTION OF THE INVENTION

EXAMPLE 1

Photocrosslinker Polymer Preparations

TABLE 1

| photocrosslinkers | VBPO (mole %)[1] | Comonomer 1 (mole %) | Comonomer 2 (mole %) |
|---|---|---|---|
| P31-1 | 3.5 | HEMA(5) | NVP(91.5) |
| P32-1 | 3.5 | VAc(10) | NVP(86.5) |
| P40-3 | 4 | DMA(96) | none |
| P40-4 | 4 | PEMA(96) | none |
| P41-1 | 6 | DMA(94) | none |

The following Examples describe the preparation of P32-1 (3), P40-3 & P41-1 (comparison), and P40-4 respectively. In addition examples demonstrating photocrosslinkers of DMA and 4-vinyl-2,6-dimethylebenzoylphosphine oxide are added (Examples 1E and 1F).

EXAMPLE 1A

Photocrosslinker Copolymer Employing N-Vinylpyrrolidone and Vinyl Acetate

This preparation, on an 8 g monomer scale, used monomers in the molar ratio: 86.5 parts N-vinylpyrrolidone (VP): 10 parts vinyl acetate (Vac): 3.5 parts vinylbenzoyldiphenylphosphine oxide (VBPO).

Methoxydiphenylphosphine, 0.520 g, was weighed to a dried 100 ml twin-neck flask, with one neck septum sealed, and coated in aluminium foil to exclude light. Toluene, 3 ml, and a magnetic stir bar were added and the flask flushed with dry nitrogen. The stopcock was briefly removed and 4-vinylbenzoyl chloride, 0.409 g, added, the flask being again flushed with dry nitrogen, then placed in a bath at 65° C., with magnetic stirring.

After 15 minutes, the other monomers: VP, 6.620 g, and Vac, 0.595 g, were diluted with a previously prepared solution of azobisisobutyronitrile (AIBN), 0.080 g in 8 ml toluene, and the mixture injected to the flask and rinsed in with a further 4 ml toluene. The polymerization mixture was heated at 65° C. with magnetic stirring for 8 hours, yielding a clear pale yellow solution, which was precipitated, in subdued light, to diethyl ether. The supernatant was discarded and the pale sludge-like precipitate taken up in 30 ml methanol and reprecipitated to ether as a curdy precipitate. The supernatant was decanted, and the polymer product dried to constant weight under vacuum at 35° C. Yield was 5.751 g (72%) of friable pale yellow polymer. Elemental analysis gave 0.65% P, corresponding to 6.9% ww VBPO units (0.209 mmol/g), and 10.70% N, corresponding to 84.5% ww VP units, and thus a mean unit mass of 115 Daltons. SEC gave Mn 32,000, MN 103,000. This implies a number average chain length of ca.280 units, with ca.7 photoactive units per chain.

EXAMPLE 1B

Photocrosslinker Copolymer Employing N-Dimethylacrylamide (I)

In this example, 4-vinylbenzoyldiphenylphosphine oxide (VBPO), 4 mol %, was copolymerized with N,N-dimethylacrylamide (DMA), 96 mol %, on a 6 g scale.

Methoxydiphenylphosphine, 0.481 g, was weighed to a dried 24×150 mm Quickfit tube, and 2.5 ml dry toluene added. The tube was then wrapped in aluminium foil to exclude light, 4-Vinylbenzoyl chloride, 0.368 g, and a magnetic stir bar were added, and the tube septum sealed, $N_2$ flushed, and placed in a bath at 65° C. with stirring. After 15 minutes a solution of DMA, 5.26 g, and AIBN, 0.060 g, in toluene, 5 ml, was injected by syringe and rinsed in with a further 3.6 ml toluene. The mixture was stirred 6 h at 65° C., yielding a viscous orange-yellow solution, which was diluted with methanol and precipitated in diethyl ether. The product was reprecipitated from methanol to ether, and vacuum dessicated at room temperature. Yield, 2.56 g (43%) of friable pale yellow polymer, analysis 0.82% P corresponding to 8.8% ww VBPO units (0.265 mmol/g). GPC using poly(ethylene glycol) standards gave Mn 25,000; Mw 100,000.

EXAMPLE 1C

Photocrosslinker Copolymer Employing N-Dimethylacrylamide (II)

Example 2B was repeated on a 12 g scale, but with monomer ratio 6 mol % VBPO (2.12 g), 94 mol % DMA (9.89 g), with 0.120 g AIBN, 22.3 ml toluene, and polymerization time extended to 8 h at 65° C. The yield was 7.17 g (60%) of yellow polymer, analysis 1.49% P corresponding to 16.0% ww VBPO (0.481 mmol/g), GPC gave Mn 12 000 and Mw 88000.

EXAMPLE 1D

Photocrosslinker Copolymer Employing 2-Phenylethyl Methacrylate

In this example, 4-vinylbenzoyldiphenylphosphine oxide (VBPO), 4 mol %, was copolymerized with 2-phenylethyl methacrylate (PEMA), 96 mol %, on a 6 g scale.

Methoxydiphenylphosphine, 0.271 g, was weighed to a dried 24×150 mm Quickfit tube, and 2.5 ml dry toluene added. The tube was then wrapped in aluminium foil to exclude light, 4-Vinylbenzoyl chloride, 0.204 g, and a magnetic stir bar were added, and the tube septum sealed, $N_2$ flushed, and placed in a bath at 65° C. with stirring. After 15 minutes a solution of PEMA, 5.60 g, and AIBN, 0.060 g, in toluene, 5 ml, was injected by syringe and rinsed in with a further 3.6 ml toluene. The mixture was stirred 6 h at 65° C., yielding a fairly viscous pale yellow solution, which was diluted with chloroform and precipitated to methanol. The product was reprecipitated from chloroform (with THF added to clarify the solution), and vacuum dessicated at room temperature. Yield, 4.67 g (78%) of friable pale yellow polymer, analysis 0.48% P corresponding to 5.2% ww VBPO units (0.1555 mmol/g). GPC in THF using polystyrene standards gave Mn 49,300; Mw 108,500.

EXAMPLE 1E

In this example, 4-vinyl-2,6-dimethylbenzoyldiphenylphosphine oxide (VDMBPO), 4 mol %, was copolymerized with N,N-dimethylacrylamide (DMA), 96 mol %, on a 12 g scale.

Methoxydiphenylphosphine, 0.979 g, was weighed to a dried flask and 5 ml dry toluene added. The flask was wrapped in aluminium foil to exclude light, 4-Vinyl-2,6-dimethylphenyl chloride, 0.885 g, and a magnetic stir bar were added, and the flask septum sealed, $N_2$ flushed, and placed in a bath at 65° C. with stirring. After 15 minutes a solution of DMA, 10.426 g, and AIBN, 0.121 g, in toluene, 9.3 ml, was injected by syringe and rinsed in with a further 8 ml toluene. The mixture was stirred 8 h at 65° C., yielding a viscous pale yellow solution, which was diluted with 20 ml ethanol and precipitated in diethyl ether. The product was reprecipitated from ethanol to hexane, and vacuum dessicated at room temperature. Yield, 8.53 g (71%) of friable pale yellow polymer, analysis 0.58% P corresponding to 6.75% ww (1.95 mol %) VDMBPO units (0.87 meq/g).

The polymer was water soluble and showed excellent hydrolytic stability; tested over the course of a year the product showed no measurable decrease in photoactivity, GPC gave Mn 6,000; Mw 26,000.

EXAMPLE 1F

Example 1E was repeated employing VDMBPO 5 mol and DMA 95 mol %. Yield was 43% of pale yellow polymer, analysis 0.86% P corresponding to 10.0% ww (2.97 mol %) VDMBPO units (0.278 meq/g). GPC gave Mn 7,000; Mw 32,500.

EXAMPLE 1G

Example 1F was repeated employing VDMBPO 5 mol % and DMA 95 mol %. Yield was 55% of pale yellow polymer, analysis 0.73% P corresponding to 8.5% ww (2.49 mol %) VDMBPO units (0.236 meq/g). GPC gave Mn 5,600; Mw 24,000.

EXAMPLE 1H 1,3,5-trimethylbenzoyl-styrylphenylphosphinc oxide (TMBSPO), 4 mol %, was copolymerized with N,N-dimethylacrylamide (DMA), 96 mol %, on a 12 g scale.

First methoxystyrylphenylphosphine, 0.800 g, was weighed to a dried flask and 5 ml dry toluene added. The flask was wrapped in aluminium foil to exclude light, 1,3,5-trimethylbenzoyl chloride, 1.061 g, and a magnetic stir bar were added, and the flask septum scaled, $N_2$ flushed, and placed in a bath at 65° C. with stirring. After 15 minutes subsequently a solution of DMA, 10.241 g in 15 ml of toluene, and AIBN, 0.120 g in 5.0 mL of toluene, were injected by syringe. The mixture was stirred 8 h at 65° C., yielding a viscous pale yellow solution, which was diluted with 20 ml ethanol and precipitated in diethyl ether. The product was reprecipitated from ethanol to diethylether, and vacuum dessicated at room temperature. Yield was 55% of pale yellow polymer, analysis 0.87% P corresponding to 10.4% ww (2.40 mol %) TMBSPO units (0.227 meq/g). GPC gave Mn 9,000; Mw 35,000.

The experiment was repeated employing TMBSPO 2.5 mol % and DMA 97.5 mol %. Yield was 79% of pale yellow polymer, analysis 0.43% P corresponding to 5.1% ww (1.19 mol %) TMBSPO units (0.1 2 meq/lg). GPC gave Mn 15,000; Mw 94,000.

Finally, the experiment was repeated employing TMBSPO 4 mol % and PEMA 96 mol %. Yield was 68% of friable pale yellow polymer, analysis 0.56% P corresponding to 5.4% ww TMBSPO units (0.149 mmol/g). GPC gave Mn 19,000 and Mw 165,000.

EXAMPLE 1I

This example illustrates the preparation of photo-crosslinkers having photoactive agent linked to the ethylene backbone by a group comprising a urethane bond.
1 Hydrolysis of poly(N-vinylpyrrolidone-vinylacetate) 60:40]

For this preperation, poly(NVP-co-VAc) 60:40 (Polysciences Inc., Mw 100,000; 40 g, 0.16 mole acetate groups) was dissolved under nitrogen in methanol (200 ml) and heated to 40° C. To this solution NaOH (6.4 g, 0.16 mol) in distilled water (8.0 ml) was added. After one night of reaction the solution was cooled to RT and neutralised with hydrochloric acid (33% aquous water solution). The polymer solution was separated from precipitated salts and dialysed (Spectrapor 6 dialysis tubes, MWCO: 1000) against frequently refreshed distilled water for two days. After dialysis the polymer solution was concentrated with a rotary evaporator and diluted with methanol (150 ml). It was precipitated to 1 liter of diethylether. The precipitated poly (NVP-co-VA) 60:40 was powdered and dried over SICAP-ENT (Merck) for one week at 40° C. in a vacuum oven connected to an oil pump, until constant weight was reached.

2 Synthesis of 4-isocyanatobenoyldiphenylphosphineoxide (IBPO)

This reaction was performed in subdued light under an inert nitrogen atmosphere. To an oven dried threeneck flask methoxydiphenylphosphineoxide (0.177 g, $6.65 \times 10^{-4}$ moles) was added, followed by dry tetrahydrofurane (THF, 10 ml). The flask was wrapped in aluminium foil, to shield the reaction from outer light. The temperature was raised to 65° C. Now 4-isocyanatobenzoylchloride (Aldrich: 0.116 g, $6.98 \times 10^{-4}$ moles, 1.05 eq.) was added in dry THF (10 ml). After a reaction time of one hour the solvent was evaporated, and the product was retrieved as a pale yellow solid. Yield: 0.192 g 83%. Analysis with $^1$H-NMR in DMSO-d6 showed a typical pattern for the photoinitiator (PI) in the aromatic region of the spectrum, while the absorptions for the starting products had virtually vanished. This product was directly used without further purification in the next step.

3 Synthesis of 4-isocyanalo-3,5-dimethylbenzoyldiphenylphosphineoxide

The reaction in example 2 was repeated with 4-isocyanato-3,5-dimethylbenzoylchloride instead of 4-isocyanatobenzoylchloride.

4 Synthesis of Photocrosslinker by Modification of Poly (NVP-co-VA) 60:40 With IBPO This reaction was performed in subdued light under an inert nitrogen atmosphere. To an oven dried threeneck flask 2 g of poly(NVP-co-VA) 60:40 was added and dissolved in 50 ml of dimethylacetamide (DMAA) at 40° C. Now 10 ml of DMAA was added to the reaction flask with the previous prepared IBPO, and the resulting light yellow solution was added to the poly(NIVP-co-VA) 60:40 solution. After a reaction time of one night it was precipitated to diethylether (350 ml). The light yellow sticky polymer was redissolved again in 30 ml of methanol and reprecipitated to 300 ml of diethylether. The polymer was collected over a Buchner funnel and dried for one night in a vacuum oven at 35° C. A light yellow rubbery polymer was retrieved. Yield: 1.824 g (91%). With $^1$H-NMR in DMSO-d6 it was found that the IBDPPO had reacted with the copolymer, and its content was estimated as 2.7 mole %. It produced a crosslinked waterswellable elastic material after blue light irradiation in an experiment where it was dissolved in water together with a polymeric crosslinker.

5 Synthesis of Photocrosslinker by Modification of Poly (NVP-co-VA) 60:40 With IDMBPO The reaction in example 4 was repeated with IDMBPO instead of IBPO. Similar yields and results could be achieved.

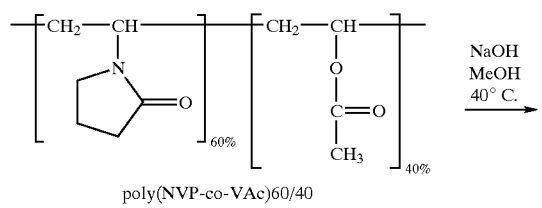

poly(NVP-co-VAc)60/40

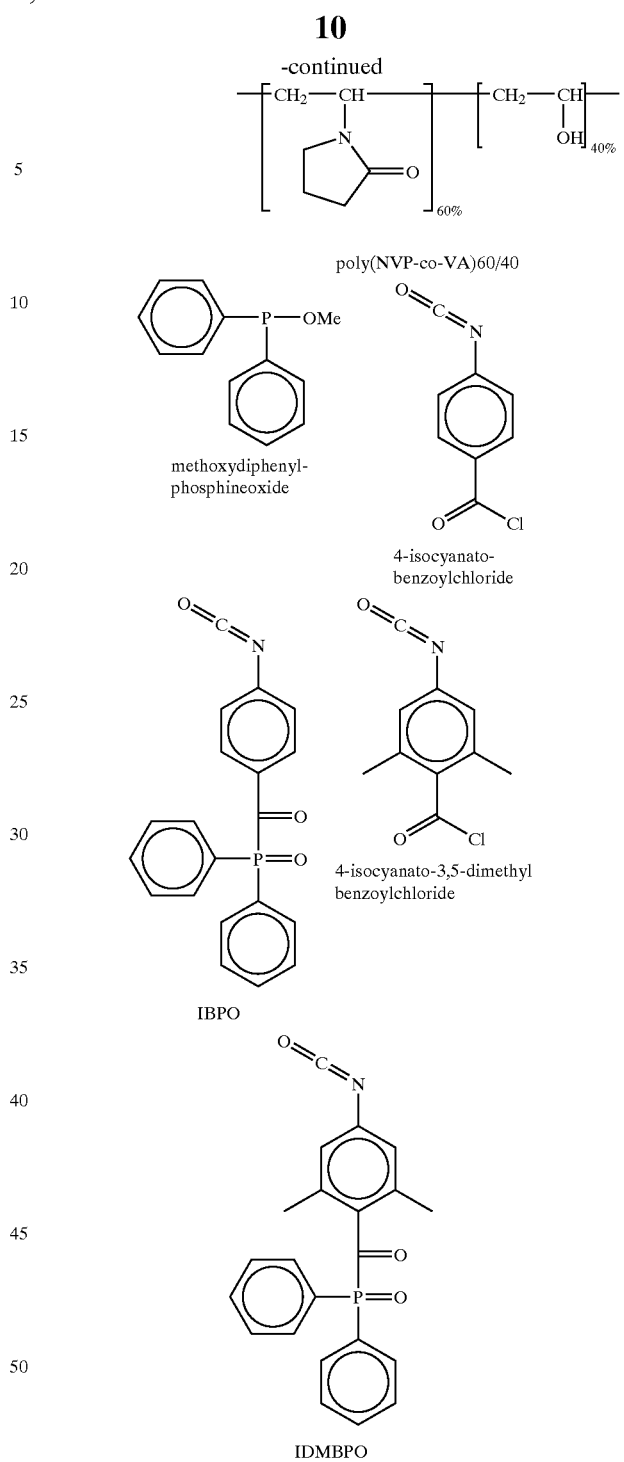

EXAMPLE 2

The following examples refer to photopolymerization including the inventive photocrosslinkers compared with photopolymerization with commercially available photoinitiators.

EXAMPLE 2A

The state of the art photoinitiator Irgacure 1800 (ex Ciba-Geigy, 10.0 mg) was dissolved, in subdued light, in 2-hydroxyethylmethacrylate (HEMA, ophthalmic grade ex Polysciences, 970 mg) and 1,6-dihydroxyhexane diacrylate (HDDA, ex, 20.0 mg), and a 10.0 mg sample pipetted into an open DSC aluminum sample pan. The sample pan, covered with a cover-slip of thin glass, was placed in the sample position of the head of a TA Instruments Differential Photocalorimeter (DPC). The temperature of the head was allowed to stabilize under $N_2$ at 37° C. (or in some cases 23°, and the sample irradiated with blue light at an intensity of 8–9 mWcm$^{-2}$.

The area of the polymerization exotherm was determined by conventional computation and the Jg$^{-1}$ of monomer calculated. From the Jg$^{-1}$ the percentage conversion of monomer to polymer was calculated using a literature value for the latent heat of polymerization of the monomer, $\Delta H_p$. The findings are collected in Table 2.

Using the same composition as was used for the DPC tests discs (2 mm thick×16 mm diameter) of polyHEMA were cast in PTFE casting cells. About 500 ng of the mixture of monomers and photoinitiator were introduced into the cell which was closed with a glass slide and irradiated with blue light, either from a blue light dental gun, or from a proprietary light generator (Efos Novacure), for 3 min.

EXAMPLE 2B

The method described in Example 2A was repeated using with the state of the art photoinitiator Lucirin TPO (ex BASF, 10.0 mg) instead of Irgacure 1800.

EXAMPLE 2C

The method described in Example 2A was repeated using HEMA (900.0 mg), no HDDA, and, instead of Irgacure 1800, a photocrosslinker according to the present invention (P31-1, see Table 1, for composition, 100.0 mg).

EXAMPLE 2D

The method described in Example 2C was repeated using a photocrosslinker according to the present invention (P32-1, see Table 1, for composition, 100.0 mg).

EXAMPLE 2E

The method described in Example 2C was repeated using a photocrosslinker according to the present invention (P40-3, see Table 1, for composition, 100.0 mg).

EXAMPLE 2F

The method described in Example 2C was repeated using a photocrosslinker according to the present invention (P41-1, see Table 1, for composition, 100.0 mg).

EXAMPLE 2G

The method described in Example 2A was repeated using a photocrosslinker according to the present invention (P32-1, 100.0 mg) instead of Irgacure 1800, HEMA (600.0 mg), water (300 mg) and no HDDA.

EXAMPLE 2H

As Example 2G, using P40-3 (50.0 mg) to replace P32-1, and HEMA (500.0 mg), water (450.0 mg).

EXAMPLE 2I

As Example 2H using P41-1(50 mg) to replace P40-3.

EXAMPLE 2J

The method described in Example 2A was repeated using 2-phenylethylacrylate (PEA, 990.0 mg, ex Polymer & Dajac Laboratories) instead of HEMA and no HDDA.

EXAMPLE 2K

The method described in Example 2A was repeated using instead of Irgacure 1800 a photocrosslinker (P404, see Table 1, for composition, 100.0 mg) and PEA (900 mg) but no HDDA or HEMA.

The % conversions of monomer to polymer in Table 2. Examples 2A and 2B, the commercial photoinitiators, and the photocrosslinkers. Examples 2C to 2E, are comparable showing that the photocrosslinkers behave as efficient photoinitiators, especially giving regard to the concentrations of photoactive species, the acylphosphine oxide (shown in Table 1). Further when these findings are compared with Examples 2G to 2I the comparison reveals that correctly designed photocrosslinkers (Examples 2H and 2I) exhibit 100% conversions in solution in water.

For the 2-phenylethylacrylate monomer the photocrosslinker P40-4, based on 2-phenylethylmethacrylate, is also very efficient as a photoinitiator (comparing Examples 2J and 2K) giving 100% conversion of monomer to polymer gel, as judged from the heat of polymerization (based on experimentally determined $\Delta H_p$).

TABLE 2

A comparison of the completeness of blue light photopolymerisation of HEMA. HEMA in water, & PEA using low molecular weight photoinitiators and photocrosslinkers

| Ex. No. | Formulation[a] (wt %)[m.eq photoactive ingredient[b]/100 g] | Heat of Polym. (Jg$^{-1}$) | Polym. time (min) | Conversion % |
|---|---|---|---|---|
| 2A | HEMA(97)HDDA(2)I1800(1)[0.51] | 351 | 3.5 | 80 |
| 2B | HEMA(97)HDDA(2)TPO(1)[2.9] | 357 | 1.5 | 82 |
| 2C | HEMA(90)P31-1(10)[2.0] | 308 | 6 | 70 |
| 2D | HEMA(90)P32-1(10)[2.3] | 309 | 3 | 71 |
| 2E | HEMA(90)P40-3(10)[2.7] | 307 | 2 | 70 |
| 2F | HEMA(90)P41-1(10)[4.8] | 361 | 1.5 | 82 |
| 2G | HEMA(60)H$_2$O(30)P32-1(10)[2.3] | >275 | >7 | >63 |
| 2H | HEMA(50)H$_2$O(45)P40-3(5)[1.4] | 452 | 7 | 100(approx.) |
| 2I | HEMA(50)H$_2$O(45)P41-1(5)[2.4] | 454 | 6 | 100(approx.) |
| 2J | PEA(99)I1800(1)[0.51] | 455 | 2.5 | 100(approx.) |
| 2K | PEA(90)P40-4(10)[1.6] | 456 | 3.5 | 100(approx.) |

[a]Photocrosslinkers, and monomer HEMA, as Table 1.: commercial photoinitiators I1800, bis(2,6-dimethoxybenzoyl)-trimethylpentylphosphine oxide (25%)+hydroxy-cyclohexylphenylketone (75%) (Irgacure 1800 ex Ciba-Geigy) TPO, 1,3,5-trimethylbenzoyldiphenylphosphine oxide (Lucirin TPO ex BASF): monomer PEA, 2-phenylethylacrylate; crosslinker HDDA, hexan-1,6-diol diacrylate

[b]m.eq of acylphosphine oxide/100 g of formulation.

EXAMPLE 3

Examples for Gelation Tests:

EXAMPLES 3A and 3B

Using the formulations described above in Examples 2J and 2K and the casting method described in Example 2A discs were prepared.

EXAMPLE 3C

Irgacure 2959 (ex Ciba-Geigy, 10.0 mg) was dissolved, in subdued lighting, in 2-hydroxyethylmethacrylate (HEMA, ophthalmic grade ex Polysciences, 550.0 mg) and water (440.0 mg). Test discs (2 mm thick×1 6 mm diameter) of polymer were cast in PTFE casting cells. About 800 mg of the mixture of monomers and photoinitiator were introduced into the cell which was closed with a glass slide and irradiated with light from a proprietary light generator (Efos Novacure), for 3 min.

EXAMPLE 3D

As Example 3C with Irgacure 2959 (30.0 mg), HEMA (540.0 mg) and water (430.0 mg).

EXAMPLE 3E

As Example 3C with P40-3 (100.0 mg) replacing Irgacure 2959, HEMA (500.0 mg), and water (400.0 mg).

EXAMPLE 3F

As Example 3C with P41-1 (70.0 mg) replacing Irgacure 2959, HEMA (510.0 mg), and water (420.0 mg).

EXAMPLE 3G

As Example 4C with P40-4 (50.0 mg) replacing Irgacure 1800, PEA (900.0 mg), and additional crosslinker, CE7-2 (2-phenylethylmethacrylate/2-hydroxy-3-acryloxypropylmethacrylate copolymer [0.9:0.1 mole ratio], 50.0 mg).

EXAMPLE 3H

As Example 3G with Irgacure 1800 (21.0 mg) replacing P40-4, PEA (940.0 mg), and crosslinker, CE7-2 (2-phenylethylmethacrylate/2-hydroxy-3-acryloxypropylmethacrylate copolymer [0.9:0.1 mole ratio], 60.0 mg).

EXAMPLE 3I

As Example 3B with PEA (750.0 mg), and photocrosslinker, P40-4 (250.0 mg).

In Table 3 are collected the tests made to check the gelation of the different formulations. Where a composition is gelled it does not dissolve in solvent, but swells to an extent related to its crosslink density. Uncrosslinked (sol) polymers dissolve.

Examples of monomers photopolymerized with conventional photoinitiators of low molecular weight, nos. 4A, 4C and 4D dissolved readily in the appropriate solvent, water for polyHEMA, and acetone for polyPEA. Example no. 4B showed an intermediate behavior and dissolved partially in acetone leaving some residual gel. Increasing the proportion of photocrosslinker to 25% (3.9 m.eq. of acylphosphine oxide, Example 4I or, adding separate crosslinker, CE7-2 (Example 4G, see below) produced acetone insoluble gel.

CE7-2, a polyPEMA which is unsaturated and PEA miscible, being a copolymer of 2-phenylethylmethacrylate/2-hydroxy-3-acryloxypropylmethacrylate [0.9:0.1 mole ratio], was employed as a supplementary crosslinker to the photocrosslinker P40-4, in Examples 4G and 4H. That CE7-2 is an effective cross-linker for photopolymerized PEA is demonstrated in example no. 4H, where in combination with Irgacure 1800 it also yields a gelled product upon irradiation. The products upon irradiation are transparent gelled elastomers of high refractive index (RI>1.54), similar in properties to PEA/PEMA copolymers.

Examples 3E and 3F which used photocrosslinkers to replace conventional photoinitiators for HEMA/water compositions were gelled and did not dissolve in water, unlike examples 4D and 4E.

TABLE 3

Gelation tests on photopolymerized materials, shewing effect of photocrosslinkers

| Ex. No. | Formulation (wt %)[1] | Effect of Solvent | Comments |
| --- | --- | --- | --- |
| 3A | PEA(99)I1800(1) | Dissolves in Acetone | Not Crosslinked |
| 3B | PEA(90)P40-4(10) | Dissolves & Swells in Acetone | Lightly Crosslinked |
| 3C | HEMA(55)H$_2$O(44)I2959[2](1) | Dissolves in Water | Not Crosslinked |
| 3D | HEMA(54)H$_2$O(43)I2959(3) | Dissolves in Water | Not Crosslinked |
| 3E | HEMA(50)H$_2$O(40)P40-3(10) | Swells in Water | Crosslinked Gel |
| 3F | HEMA(51)H$_2$O(42)P41-1(7) | Swells in Water | Crosslinked Gel |
| 3G | PEA(90)CE7-2(5)P40-4(5) | Swells in Acetone | Crosslinked Gel |
| 3H | PEA(94)CE7-2(6)I1800(2.1) | Swells in Acetone | Crosslinked Gel |
| 3I | PEA(75)P40-4(25) | Swells in Acetone | Crosslinked Gel |

[1]See Tables 1. & 2., and text for an explanation of materials codes
[2]I2959, 2-hydroxy-4'-hydroxyethoxy-2-propiophenone (UV curing)

The crosslinked structure of the water swollen hydrogels (4E and 4F) was confirmed by stress relaxation tests.

EXAMPLE 4

The method described in Example 2A was repeated using the following formulations:

Formulations (wt %)

4A, water (80)/photocrosslinker according Example 1F(20)

4B, water (80)/photocrosslinker according Example 1H(20)

4C, HEMA(45)/water(35)/photocrosslinker according to Example 1C(20)

4D, HEMA(45)/water(35)/photocrosslinker according to Example 1F(20)

4E, HEEMA(45)/water(35)/photocrosslinker according Example 1H(20)

4F, HEMA(45)/H20(35)

The coherent and clear gels resulted from the irradiation of the formulations with blue light, and their relative crosslinked nature was characterized in two ways. The first method was to measure the stress relaxation of the networks, using a Rheometrics RDA-11, and the second method used was to measure the smiling of the gels in water.

Stress Relaxation Tests-method

The RDA-11 was set up as with the 16 mm gelled sample damped between parallel plates of 25 mm, heated to 35° C., and a strain of 30% applied. During the test the instrument measures the instantaneous stress necessary to maintain 35%, and plots the instantaneous shear modulus (Gi) against log t. In Table 3. the percentage reductions in the modulus Gi for the formulations 4A to 4F between i=10 and 100 s are compared as (G(10)−G(100)/G(10))×100 both before and after swelling in water. The results confirm that the photocrosslinker gel possess coherent network structures.

Table 3. Average Stress Relaxations of Photocrosslinked Formulations 4A to 4F, Measured at 35° C.

TABLE 3

Average Stress Relaxations of Photocrosslinked Formulations 4A to 4F, measured at 35° C.

| Average stress relaxation | 4A | 4B | 4C | 4D | 4E | 4F |
|---|---|---|---|---|---|---|
| Before swelling-disc1 | No result | | 4.9 | 3.4 | No result | Not measurable |
| Before swelling-disc2 | 9.3 | | 15.5 | 10.9 | 29.4 | |
| After swelling-disc1 | | | 21.4 | 17.4 | | |
| After swelling-disc2 | 19.1 | | 19.0 | 13.0 | 12.4 | Not measurable |

Swelling Test Method

Samples discs from formulations 4A through 4F were weighed, immersed in water for 24 hours at 20° C., dried, and reweighed. Table 4 compares the water absorbed by each formulation on a percentage basis.

TABLE 4

Percentage water absorbed at 25° C. by photocrosslinked gels

| Water absorbed (wt %) | 4A | 4B | 4C | 4D | 4E | 4F |
|---|---|---|---|---|---|---|
| Disc1 | | | 222 | 191 | | Not measurable |
| Disc2 | 130 | 219 | 230 | 172 | 255 | Not measurable |

It was observed that upon irradiation with blue light, the formulation prepared without a crosslinker (4F) did not gel and that no discs suitable for any measurements were formed. Satisfactory discs were prepared from other formulations and stress relaxation results and the water absorption results were in agreement with the sequence: most highly crosslinked 4A>4C<4E least highly crosslinked.

What is claimed is:

1. Macromolecular hydrophilic photocrosslinker having a general formula

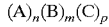

producing, upon exposure to light, crosslinked networks, wherein
(i) A, B and C are units of substituted ethylene groups in the macromolecular structure;
(ii) A, B and C are randomly distributed and the unit C carries a photoactive group, which is an acyl phosphine oxide or aroyl phosphine oxide;
(iii) n=0–98 mole %, m=0–98 mole %, n+m=50–98 mole % and p=0.5–50 mole %;
and the photoactive group is linked to the ethylene groups of units C by a linking group comprising a group having the structure —O—C(O)—NH—, and wherein the photoactive groups, upon exposure to light of wavelength above 305 nm, generate radicals retained on the macromolecular photocrosslinker and react to provide a crosslinked network structure.

2. Macromolecular hydrophilic photocrosslinker according to claim wherein the linking group has the structure of —O—C(O)—NH—Ph-, wherein Ph denotes an optionally substituted phenylene group.

3. Macromolecular hydrophilic photocrosslinker having a general formula

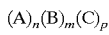

producing, upon exposure to light, crosslinked networks, wherein
(i) A, B and C are units of substituted ethylene groups in the macromolecular structure;
(ii) A, B and C are randomly distributed and the unit C carries a photoactive group, which is an acyl phosphine oxide or aroyl phosphine oxide;
(iii) n=0–98 mole %, m=0–98 mole %, n+m=50–98 mole % and p=0.5–50 mole %;
and the ethylene units A, B and C comprise substituents in accordance with A=—$CH_2$—$C(R^1R^2)$—, B=—$CH_2$—C$(R^1R^3)$—, C=—$CH_2$—$C(R^1R^4)$—, wherein $R^1$ is hydrogen or methyl;
$R^2$ is —$CON(Me)_2$, —$CO_2CH_2CH_2OH$, —$OCOCH_3$, —$OCOCH_2CH_2Ph$, —OH or a lactam group;
$R^3$ is —$CON(Me)_2$, —$CO_2CH_2CH_2OH$, —$OCOCH_3$, —$OCOCH_2CH_2Ph$, —OH or a lactam group when B is —$CH_2$—$C(R^1R^3)$— with the proviso that $R^2$ and $R^3$ are not the same unless $R^2$ and $R^3$ are —OH; and
$R^4$ is —$R^5P(O)R^6OC(O)R^7$, wherein $R^5$, $R^6$ and $R^7$ each individually comprises a phenyl, methylphenyl, dimethylphenyl, trimethylphenyl, methoxyphenyl, dimethoxyphenyl, trimethoxyphenyl, methylolphenyl, dimethylolphenyl, trimethylolphenyl or styryl radical,
and wherein the photoactive groups, upon exposure to light of wavelength above 305 nm, generate radicals retained on the macromolecular photocrosslinker and react to provide a crosslinked network structure.

4. Macromolecular hydrophilic photocrosslinker according to claim 3, wherein $R^2$ and $R^3$ are selected so as to form a water-soluble molecule.

5. Macromolecular hydrophilic photocrosslinker according to claim 3, wherein said lactam groups together with units A or B constitute N-vinylpyrrolidone units.

6. Macromolecular hydrophilic photocrosslinker according to claim 3, wherein at least one of $R^2$ and $R^3$ is hydroxyl.

7. Macromolecular hydrophilic photocrosslinker according to claim 3, wherein A is N-vinylpyrrolidone, and B is vinyl alcohol.

8. Macromolecular hydrophilic photocrosslinker having a general formula $$(A)_n(B)_m(C)_p$$

producing, upon exposure to light, crosslinked networks, wherein
(i) A, B and C are units of substituted ethylene groups in the macromolecular structure;
(ii) A, B and C are randomly distributed and the unit C carries a photoactive group, which is an acyl phosphine oxide or aroyl phosphine oxide;
(iii) n=0–98 mole %, m=0–98 mole %, n+m=50–98 mole % and p=0.5–50 mole %;
and the ethylene units A, B and C comprise substituents in accordance with A=—CH$_2$—C($R^1R^2$)—, B=—CH$_2$—C($R^1R^3$)—, C=—CH$_2$—C($R^1R^4$)—,
wherein $R^1$ is hydrogen or methyl;
$R^2$ is —CON(Me)$_2$, —CO$_2$CH$_2$CH$_2$OH, —OCOCH$_3$, —OCOCH$_2$CH$_2$Ph, —OH or a lactam group;
$R^3$ is —CON(Me)$_2$, —CO$_2$CH$_2$CH$_2$OH, —OCOCH$_3$, —OCOCH$_2$CH$_2$Ph, —OH or a lactam group when B is —CH$_2$—C($R^1R^3$)— with the proviso that $R^2$ and $R^3$ are not the same unless $R^2$ and $R^3$ are —OH; and
$R^4$ is —$R^8$C(O)P(O)$R^9R^{10}$, wherein $R^8$ is —O—C(O)—NH—$R^{11}$ and $R^9$, $R^{10}$ and $R^{11}$ each individually comprises a phenyl, methylphenyl, dimethylphenyl, trimethylphenyl, methoxyphenyl, dimethoxyphenyl, trimethoxyphenyl, methylolphenyl, dimethylolphenyl, trimethylolphenyl or styryl radical,
and wherein the photoactive groups, upon exposure to light of wavelength above 305 nm, generate radicals retained on the macromolecular photocrosslinker and react to provide a crosslinked network structure.

9. Macromolecular hydrophilic photocrosslinker according to claim 8, wherein A and B are a copolymer comprising N-vinylpyrrolidone and vinyl alcohol and C is formed from 4-isocyanatobenzoyldiphenyl phosphine oxide.

10. Macromolecular hydrophilic photocrosslinker according to claim 8, wherein A and B are a copolymer comprising N-vinylpyrrolidone and vinyl alcohol and C is formed from 4-isocyanato-3,5-dimethylbenzoyl diphenyl phosphine oxide.

11. Macromolecular hydrophilic photocrosslinker according to claim 8, wherein $R^2$ and $R^3$ are selected so as to form a water-soluble molecule.

12. Macromolecular hydrophilic photocrosslinker according to claim 1, wherein the photocrosslinker is provided with functional groups for crosslinking.

13. Macromolecular hydrophilic photocrosslinker according to claim 12, wherein the photocrosslinker is provided with functional groups that are selected from the group consisting of vinylic, acrylic and methacrylic groups.

14. Macromolecular hydrophilic photocrosslinker according to claim 13, wherein the photocrosslinker is provided with functional groups for crosslinking.

15. Macromolecular hydrophilic photocrosslinker according to claim 14, wherein the photocrosslinker is provided with functional groups that are selected from the group consisting of vinylic, acrylic and methacrylic groups.

16. Macromolecular hydrophilic photocrosslinker according to claim 8, wherein the photocrosslinker is provided with functional groups for crosslinking.

17. Macromolecular hydrophilic photocrosslinker according to claim 16, wherein the photocrosslinker is provided with functional groups that are selected from the group consisting of vinylic, acrylic and methacrylic groups.

18. Macromolecular hydrophilic photocrosslinker having a general formula $$(A)_n(B)_m(C)_p$$

producing, upon exposure to light, crosslinked networks, wherein
(i) A, B and C are units of substituted ethylene groups in the macromolecular structure;
(ii) A, B and C are randomly distributed and the unit C carries a photoactive group, which is an acyl phosphine oxide or aroyl phosphine oxide, A is N-vinylpyrrolidone and B is vinyl alcohol;
(iii) n=0–98 mole %, m=0–98 mole %, n+m=50–98 mole % and p=0.5–50 mole %;
and wherein the photoactive groups, upon exposure to light of wavelength above 305 nm, generate radicals retained on the macromolecular photocrosslinker and react to provide a crosslinked network structure.

19. Macromolecular hydrophilic photocrosslinker having a general formula $$(A)_n(B)_m(C)_p$$

producing, upon exposure to light, crosslinked networks, wherein
(i) A, B and C are units of substituted ethylene groups in the macromolecular structure;
(ii) A, B and C are randomly distributed, A is N-vinylpyrrolidone, B is vinyl acetate, which is hydrolyzable to form vinyl alcohol, and C is 4-vinylbenzoyldiphenylphosphine oxide;
(iii) n=0–98 mole %, m=0–98 mole %, n+m=50–98 mole %, and p=0.5–50 mole %;
wherein the photoactive groups, upon exposure to light of wavelength above 305 nm, generate radicals retained on the macromolecular photocrosslinker and react to provide a crosslinked network structure.

20. Macromolecular hydrophilic photocrosslinker having a general formula $$(A)_n(B)_m(C)_p$$

producing, upon exposure to light, crosslinked networks, wherein
(i) A, B and C are units of substituted ethylene groups in the macromolecular structure;
(ii) A, B and C are randomly distributed, A is N-vinylpyrrolidone, B is 2-hydroxyethyl methacrylate and C is 4-vinylbenzoyl diphenylphosphine oxide;
(iii) n=0–98 mole %, m=0–98 mole %, n+m=50–98 mole % and p=0.5–50 mole %;
wherein the photoactive groups, upon exposure to light of wavelength above 305 nm, generate radicals retained on the macromolecular photocrosslinker and react to provide a crosslinked network structure.

21. Macromolecular hydrophilic photocrosslinker having a general formula $(A)_n(B)_m(C)_p$ producing, upon exposure to light, crosslinked networks, wherein
   (i) A, B and C are units of substituted ethylene groups in the macromolecular structure;
   (ii) A, B and C are randomly distributed and wherein A or B is N,N-dimethylacryl amide and C is formed from a compound selected from the group consisting of 4-vinylbenzoyl diphenyl phosphine oxide, 4-vinyl-2,6-dimethylbenzoyl diphenyl phosphine oxide and 1,3,5-trimethylbenzoyl styrylphenyl phosphine oxide;
   (iii) n=0–98 mole %, m=0–98 mole %, n+m=50–98 mole % and p=0.5–50 mole %;
wherein the photoactive groups, upon exposure to light of wavelength above 305 nm, generate radicals retained on the macromolecular photocrosslinker and react to provide a crosslinked network structure.

22. An aqueous composition comprising the macromolecular hydrophilic photocrosslinker according to claim 1 and (i) a hydrophilic polymer carrying functional groups for crosslinking, wherein the functional groups comprise vinylic, acrylic or methacrylic groups or a combination thereof, or (ii) at least one copolymerizable vinylic, acrylic or methacrylic monomer.

23. An aqueous composition, comprising 2-hydroxyethyl methacrylate and the macromolecular hydrophilic photocrosslinker according to claim 19.

24. An aqueous composition, comprising 2-hydroxyethyl methacrylate and the macromolecular hydrophilic photocrosslinker according to claim 21.

25. An aqueous composition, comprising 2-hydroxyethyl methacrylate and the macromolecular hydrophilic photocrosslinker according to claim 8.

26. A composition comprising 2-hydroxyethyl methacrylate and the photocrosslinker according to claim 19.

27. A composition comprising 2-hydroxyethyl methacrylate and the photocrosslinker according to claim 20.

28. A composition comprising 2-hydroxyethyl methacrylate and the photocrosslinker according to claim 21.

29. A method of preparing a photocrosslinker, comprising reacting a hydrophilic macromolecule of the formula $(A)_n(B)_m(C)_p$ wherein (i) A, B and C are units of substituted ethylene groups in the macromolecular structure;
   (ii) A, B and C are randomly distributed and at least the unit C carries a hydroxyl group;
   (iii) n=0–98 mole %, m=0–98 mole %, n+m 50–98 mole % and p=0.5–50 mole % with an isocyanate-substituted photoactive agent having the structure $C(O)=N-R^{11}-C(O)P(O)R^9R^{10}$, wherein $R^9$, $R^{10}$ and $R^{11}$ each individually comprises a phenyl, methylphenyl, dimethylphenyl, trimethylphenyl, methoxyphenyl, dimethoxyphenyl, trimethoxyphenyl, methylolphenyl, dimethylolphenyl, trimethylolphenyl or styryl radical.

30. A method of forming a macromolecular crosslinked network from an aqueous composition comprising a photocrosslinker according to claim 1, comprising irradiating the composition with light of a wavelength exceeding 305 nm for a time to form a solid article.

31. A method of forming a macromolecular crosslinked network from an aqueous composition according to claim 30, wherein said composition further comprises at least one copolymerizable vinylic, acrylic or methacrylic monomer.

32. A method of forming a macromolecular crosslinked network from an aqueous composition according to claim 30, wherein said composition further comprises a hydrophilic polymer provided with functional vinylic, acrylic or methacrylic groups.

33. A method according to claim 32, wherein said hydrophilic polymer forms discrete crosslinkable units in a form of water-soluble particles.

34. A method of forming a macromolecular crosslinked network from an aqueous composition according to claim 24, comprising irradiating the composition with light of a wavelength exceeding 305 nm for a time to form a solid article.

35. A method of forming a macromolecular crosslinked network from an aqueous composition according to claim 25, comprising irradiating the composition with light of a wavelength exceeding 305 nm for a time to form a solid article.

36. A method of forming a macromolecular crosslinked network from an aqueous composition according to claim 26, comprising irradiating the composition with light of a wavelength exceeding 305 nm for a time to form a solid article.

37. A method of forming a macromolecular crosslinked network from an aqueous composition according to claim 27, comprising irradiating the composition with light of a wavelength exceeding 305 nm for a time to form a solid article.

38. A method of forming a macromolecular crosslinked network from an aqueous composition according to claim 28, comprising irradiating the composition with light of a wavelength exceeding 305 nm for a time to form a solid article.

39. A method according to claim 34, wherein an ophthalmic lens is produced from said composition.

40. A method according to claim 35, wherein an ophthalmic lens is produced from said composition.

41. A method according to claim 36, wherein an ophthalmic lens is produced from said composition.

42. A method according to claim 37, wherein an ophthalmic lens is produced from said composition.

43. A method according to claim 38, wherein an ophthalmic lens is produced from said composition.

44. A method according to claim 39, comprising the steps of injecting the composition into a capsular bag of an eye and crosslinking the composition into a final lens product by irradiation with light of a wavelength exceeding 305 nm.

45. A method according to claim 40, comprising the steps of injecting the composition into a capsular bag of an eye and crosslinking the composition into a final lens product by irradiation with light of a wavelength exceeding 305 nm.

46. A method according to claim 41, comprising the steps of injecting the composition into a capsular bag of an eye and crosslinking the composition into a final lens product by irradiation with light of a wavelength exceeding 305 nm.

47. A method according to claim 42, comprising the steps of injecting the composition into a capsular bag of an eye and crosslinking the composition into a final lens product by irradiation with light of a wavelength exceeding 305 nm.

48. A method according to claim 43, comprising the steps of injecting the composition into a capsular bag of an eye and crosslinking the composition into a final lens product by irradiation with light of a wavelength exceeding 305 nm.

49. An ophthalmically acceptable composition comprising the photocrosslinker according to claim 1, having a refractive index of at least 1.39 and a suitable viscosity to be injected through a standard cannula of 15 Gauge or finer.

50. An ophthalmically acceptable composition comprising the photocrosslinker according to claim 3, having a refractive index of at least 1.39 and a suitable viscosity to be injected through a standard cannula of 15 Gauge or finer.

51. An ophthalmically acceptable composition comprising the photocrosslinker according to claim 8, having a refractive index of at least 1.39 and a suitable viscosity to be injected through a standard cannula of 15 Gauge or finer.

52. An ophthalmically acceptable composition comprising the photocrosslinker according to claim 18, having a refractive index of at least 1.39 and a suitable viscosity to be injected through a standard cannula of 15 Gauge or finer.

53. An ophthalmically acceptable composition comprising the photocrosslinker according to claim 19, having a refractive index of at least 1.39 and a suitable viscosity to be injected through a standard cannula of 15 Gauge or finer.

54. An ophthalmically acceptable composition comprising the photocrosslinker according to claim 20, having a refractive index of at least 1.39 and a suitable viscosity to be injected through a standard cannula of 15 Gauge or finer.

55. An ophthalmically acceptable composition comprising the photocrosslinker according to claim 21, having a refractive index of at least 1.39 and a suitable viscosity to be injected through a standard cannula of 15 Gauge or finer.

56. A method of forming a macromolecular crosslinked network from an aqueous composition comprising macromolecular hydrophilic photocrosslinker, the method comprising irradiating the composition with light of a wavelength exceeding 305 nm for a time to form an ophthalmic lens, said photocrosslinker having a general formula $(A)_n(B)_m(C)_p$ wherein (i) A, B and C are units of substituted ethylene groups in the macromolecular structure;

(ii) A, B and C are randomly distributed and the unit C carries a photoactive group that is an acyl phosphine oxide or aroyl phosphine oxide, (iii) n=0–98 mole %, m=0–98 mole %, n+m=50–98 mole % and p=0.5–50 mole %;

wherein the photoactive groups, upon exposure to light of wavelength above 305 nm, generate radicals retained on the macromolecular photocrosslinker and react to provide a crosslinked network structure.

57. A method according to claim 56, wherein the photoactive group is linked to the ethylene groups of unit C by a linking group comprising a phenylene group, said phenylene group being optionally substituted.

58. A method according to claim 56, wherein the composition is injected into the capsular bag of the eye and the composition is crosslinked into a final lens product by irradiation with light of a wavelength exceeding 305 nm.

59. An ophthalmically acceptable composition comprising macromolecular hydrophilic photocrosslinker having a general formula $(A)_n(B)_m(C)_p$ and of producing, upon exposure to light, crosslinked networks, wherein (i) A, B and C are units of substituted ethylene groups in the macromolecular structure;

(ii) A, B and C are randomly distributed and the unit C carries a photoactive group, which is an acyl phosphine oxide or aroyl phosphine oxide;

(iii) n=0–98 mole %, m=0–98 mole %, n+m=50–98 mole % and p=0.5–50 mole %;

and the photoactive groups, upon exposure to light of wavelength above 305 nm, generate radicals retained on the macromolecular photocrosslinker and react to provide a crosslinked network structure, and wherein said composition has a refractive index of at least 1.39 and a suitable viscosity to be injected through a standard cannula of 15 Gauge or finer.

60. An ophthalmically acceptable composition according to claim 59, wherein the photoactive group is linked to the ethylene groups of units C by a linking group comprising a phenylene group, said phenylene group being optionally substituted.

61. A method of forming an intraocular lens, comprising injecting an ophthalmically acceptable composition comprising macromolecular hydrophilic photocrosslinker into the capsular bag of the eye, said photocrosslinker having a general formula $(A)_n(B)_m(C)_p$ and producing, upon exposure to light, crosslinked networks, wherein (i) A, B and C are units of substituted ethylene groups in the macromolecular structure;

(ii) A, B and C are randomly distributed and the unit C carries a photoactive group, which is an acyl phosphine oxide or aroyl phosphine oxide;

(iii) n=0–98 mole %, m=0–98 mole %, n+m=50–98 mole % and p=0.5–50 mole %;

and irradiating the composition with light of wavelength above 305 nm to generate radicals which are retained on the macromolecular photocrosslinker and react to provide a crosslinked network structure.

62. A method according to claim 61, wherein the photoactive group of the photocrosslinker is linked to the ethylene groups of units C by a linking group comprising a phenylene group, said phenylene group being optionally substituted.

63. A method of forming a macromolecular crosslinked network from an aqueous composition comprising macromolecular hydrophilic photocrosslinker, comprising irradiating the composition with light of wavelength above 305 nm for a time to form a solid article, said photocrosslinker having a general formula $(A)_n(B)_m(C)_p$ wherein (i) A, B and C are units of substituted ethylene groups in the macromolecular structure;

(ii) A, B and C are randomly distributed and the unit C carries a photoactive group that is an acyl phosphine oxide or aroyl phosphine oxide, (iii) n=0–98 mole %, m=0–98 mole %, n+m=50–98 mole % and p=0.5–50 mole %;

wherein the photoactive groups, upon exposure to light of wavelength above 305 nm, generate radicals retained on the macromolecular photocrosslinker and react to provide a crosslinked network structure, and wherein said composition further comprises at least one copolymerizable vinylic, acrylic or methacrylic monomer.

64. A method according to claim 63, wherein the photoactive group of the photocrosslinker is linked to the ethylene groups of units C by a linking group comprising a phenylene group, said phenylene group being optionally substituted.

65. A method of forming a macromolecular crosslinked network from an aqueous composition comprising macromolecular hydrophilic photocrosslinker, comprising irradiating the composition with light of wavelength above 305 nm for a time to form a solid article, said photocrosslinker having a general formula $(A)_n(B)_m(C)_p$ wherein (i) A, B and C are units of substituted ethylene groups in the macromolecular structure;

(ii) A, B and C are randomly distributed and the unit C carries a photoactive group that is an acyl phosphine oxide or aroyl phosphine oxide, (iii) n=0–98 mole %, m=0–98 mole %, n+m=50–98 mole % and p=0.5–50 mole %;

wherein the photoactive groups, upon exposure to light of wavelength above 305 nm, generate radicals retained on the macromolecular photocrosslinker and react to provide a crosslinked network structure, and wherein said composition further comprises a hydrophilic polymer provided with functional vinylic, acrylic or methacrylic groups.

66. A method according to claim 65, wherein the photoactive group of the photocrosslinker is linked to the ethylene groups of units C by a linking group comprising a phenylene group, said phenylene group being optionally substituted.

67. A method according to claim 65, wherein said hydrophilic polymer forms discrete crosslinkable units in the form of water-soluble particles.

68. A method according to claim 63, wherein an ophthalmic lens is produced from said composition.

69. A method according to claim 65, wherein an ophthalmic lens is produced from said composition.

70. A method according to claim 68, wherein the composition is injected into the capsular bag of the eye and the composition is crosslinked into a final lens product by irradiation with light of a wavelength exceeding 305 nm.

71. Method according to claim 69, wherein the composition is injected into the capsular bag of the eye and the composition is crosslinked into a final lens product by irradiation with light of a wavelength exceeding 305 nm.

72. A photoactive agent having the structure of:

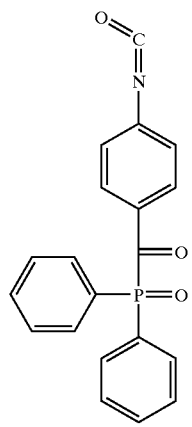

73. A photoactive agent having the structure of:

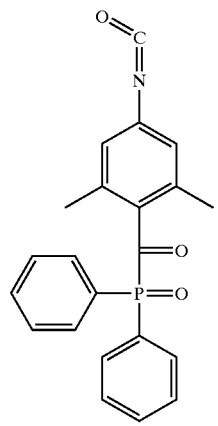

* * * * *

UNITED STATES PATENT AND TRADEMARK OFFICE
CERTIFICATE OF CORRECTION

PATENT NO. : 6,849,669 B1
DATED : February 1, 2005
INVENTOR(S) : Kenneth A. Hodd et al.

It is certified that error appears in the above-identified patent and that said Letters Patent is hereby corrected as shown below:

Column 16,
Line 29, change "claim wherein" to -- claim 1 wherein --.

Column 17,
Line 64, "claim 13" to -- claim 3 --.

Column 21,
Line 52, change "and of producing" to -- and producing --.

Signed and Sealed this

Fifth Day of July, 2005

JON W. DUDAS
*Director of the United States Patent and Trademark Office*